Dec. 28, 1954  J. W. NELSON  2,698,336
PURIFICATION OF CRUDE WAX OXIDATES
Filed Aug. 16, 1950
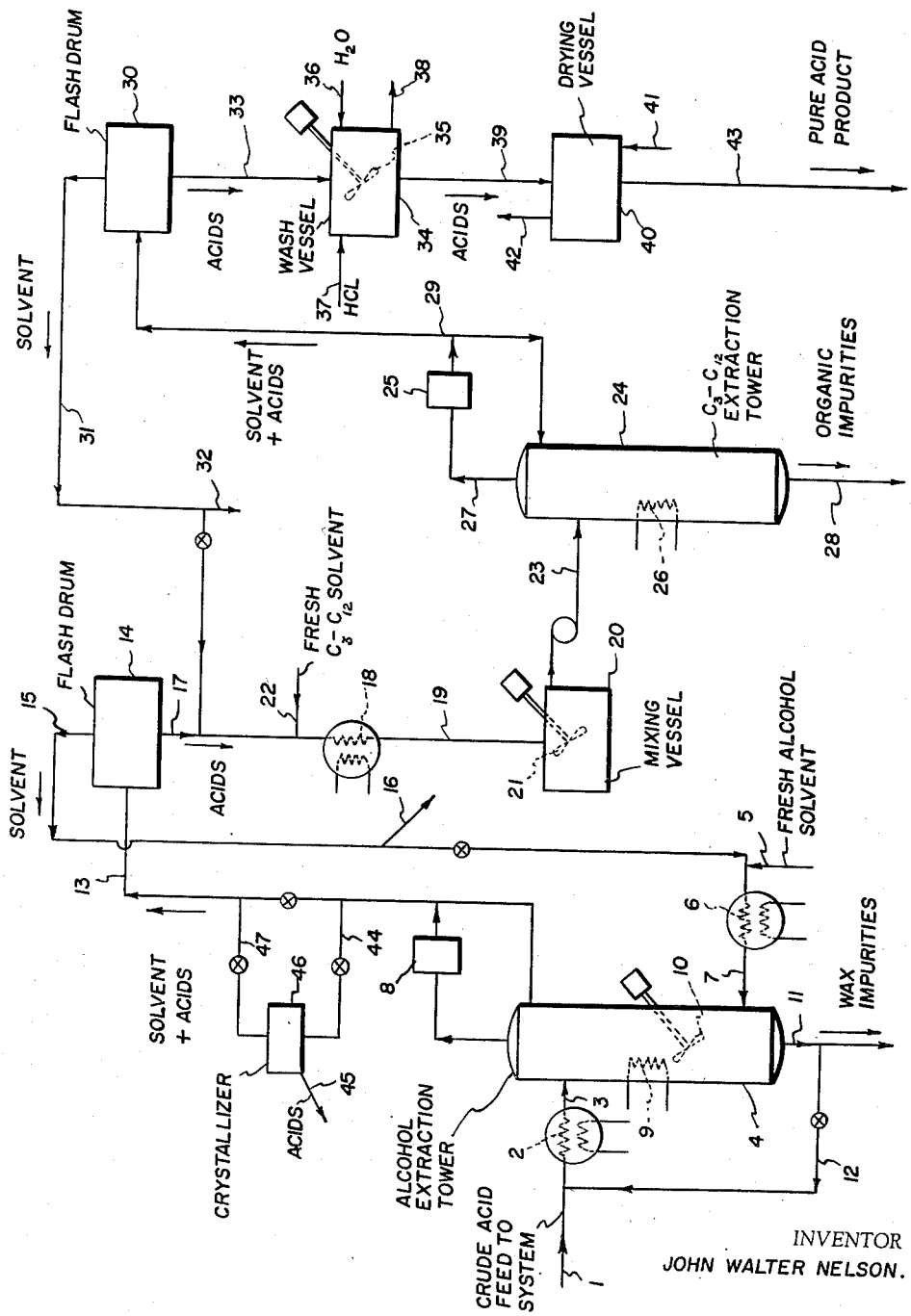
INVENTOR
JOHN WALTER NELSON.
BY Adams, Forward & McLean
ATTORNEYS United States Patent Office 2,698,336
Patented Dec. 28, 1954

2,698,336

PURIFICATION OF CRUDE WAX OXIDATES

John Walter Nelson, Hammond, Ind., assignor to Sinclair Refining Company, New York, N. Y., a corporation of Maine Application August 16, 1950, Serial No. 179,758

6 Claims. (Cl. 260—452)

My invention relates to the purification, by a dual solvent extraction procedure, of crude wax acid mixtures of high molecular weight prepared by conversion of $C_{34}$–$C_{55}$ microcrystalline wax under controlled oxidation conditions. In particular, I have found that the microcrystalline wax acids can be obtained in a high degree of purity and in improved yields by extraction in two stages, first with a polar organic solvent, e. g. a lower aliphatic alcohol, and then with a light hydrocarbon naphtha fraction.

In my copending application, Serial No. 148,729, filed March 9, 1950, now abandoned, I have disclosed new, useful high molecular weight organic acid compositions and a general method for their preparation, by conversion of $C_{34}$–$C_{55}$ microcrystalline waxes under controlled oxidation conditions. The acid compositions are especially characterized by saponification numbers in the range of about 100 to 500, their high content of fatty acid molecules having upwards of eighteen carbon atoms, and low solubility in water. Essentially, I have disclosed that the acid compositions are prepared by oxidizing microcrystalline waxes having 34 to 55 carbon atoms per molecule in the presence of a stoichiometric excess of oxygen and about 0.1 to 4.0 per cent by weight of an oxidation catalyst at a temperature in excess of about 100° C. for a period of time sufficient to effect substantially complete conversion of the waxes to acids. The reaction mass essentially comprises a mixture of carboxylic acids of high molecular weight contaminated with small quantities of organic and inorganic materials such as catalyst material, side reaction products, unreacted wax, and color bodies. I have disclosed in my copending application Serial No. 157,177 filed April 20, 1950, now U. S. Patent No. 2,610,974, that the acids may be obtained in purified form by washing the crude acid mixture free of inorganic materials with water and/or an inorganic acid and then distilling the mixture to separate out the higher acids. For example, the acid mixture may be washed with water and hydrochloric acid and then subjected to flash or molecular distillation.

But since the monocarboxylic acids I prepare have considerably more than eighteen carbon atoms per molecule and are characterized by extremely low vapor pressures, it is difficult to purify them by distillation. Distillation in a flash still or molecular still, such as the falling film still, does produce satisfactory products but the yield is only about 25 to 55 per cent, depending on the saponification value of the crude oxidate. However, the cost is relatively high and operating capacity is limited. Further, the overhead products from such distillation procedures contain unreacted hydrocarbons such as wax and oxygenated products other than acids. This is because any given aliphatic hydrocarbon boils lower than an oxygenated compound with the same number and arrangement of carbon atoms or, expressed another way, addition of oxygen to the molecule in the acid preparation process increases its boiling point. Thus inert hydrocarbon material cannot be separated from the crude oxidate by distillation since a group of wax molecules of one molecular weight will distill under the same conditions of temperature and pressure as a group of acid molecules of lower molecular weight.

In my application Serial No. 169,215, filed June 20, 1950, I have disclosed an extraction procedure for purifying the crude wax acid reaction mixture which represents an improvement over distillation in terms of higher yield, better product color and reduced operating costs. According to this process the microcrystalline wax acids of good purity can be obtained by extracting the crude acid composition with an organic solvent selected from the saturated hydrocarbons having three to twelve carbon atoms per molecule under conditions whereby the ratio of solvent to crude acid is in the range approximating 2:1 to 12:1 by weight and the temperature and pressure are such as to maintain the solvent in liquid phase. The $C_3$ to $C_{12}$ solvents have proved to be excellent extraction agents for the crude oxidates, with yields varying between 32 and 70 per cent. However, the disadvantage in using such solvents is that they extract inert material, such as unreacted microcrystalline wax along with the monocarboxylic acids.

I have now found that product yields and purity are unexpectedly improved by first extracting the acid compositions with a polar organic solvent, particularly a light oxygen-containing solvent such as a lower aliphatic alcohol, before extraction with the $C_3$ to $C_{12}$ organic solvent. I have found that it is important for high yields and to obtain a wax-free oxidate that the polar extraction precede the naphtha fractionation. The operating conditions are also important in both stages of treatment. The polar solvent and crude acid are contacted in a solvent-acid weight ratio in the range approximating 6:1 to 10:1. It is necessary to maintain a temperature and pressure relationship to keep the solvent in liquid phase. Thus, in extracting the crude acid compositions to obtain maximum possible yield and purity of acid product, the impure acids are contacted with a lower aliphatic alcohol such as ethanol, at a solvent to acid ratio of 6:1 to 10:1 by weight. The mixture, thoroughly agitated, is heated to about 140° to 175° F. in an extraction tower and a solvent fraction enriched with acid material separated therefrom. The solvent is removed, e. g. by distillation, and the acids are then contacted in a second extraction tower with a $C_3$ to $C_{12}$ saturated hydrocarbon solvent, e. g., a naphtha cut boiling within the range of 80° to 200° F. The hydrocarbon solvent is added to the acids in a ratio in the range approximating 2:1 to 12:1 by weight. The temperature is maintained at about 150° to 175° F. and the pressure regulated to keep the solvent in liquid phase. The mixture is cooled, a solvent fraction enriched in pure acids taken off overhead and the solvent is removed. Advantageously, the pure acids are finally washed with water and a mineral acid, such as hydrochloric acid and the pure product so obtained is dried. The residue from the first extraction can be worked up by retreatment to increase the yield of low saponification number wax acids. Product yields as high as 97 per cent by weight on the charge material are obtained by my two stage process.

I use a lower boiling, oxygen-containing organic polar solvent to effect extraction. The lower aliphatic alcohols and light ketones, such as methyl ethyl ketone, are exemplary. Of the alcohol solvents, I particularly prefer ethanol and methanol. Alcohol mixtures may be used or the alcohol employed can be in dilute aqueous form. For instance, 95 per cent ethanol in water is a satisfactory solvent. The amount of the solvent used in my process is critical in effecting satisfactory extraction of oxidate from inerts. I found that the mixture of acids displays a surprising mutual solubility effect—one acid upon another and the acids on the wax. As a result, it is necessary to add sufficient solvent beyond that required for ordinary solution in order to overcome this effect. On the other hand, excessive dilution is undesirable since the solvent then dissolves the wax, which is normally about 1 per cent soluble unless solubilized by the carboxylic acids. Accordingly, the polar solvent is added in amounts so that the ratio of solvent to oxidate is in the range approximating 6:1 to 10:1 by weight. Within these limitations, the higher the molecular weight of the acid (conveniently measured by the saponification number thereof) the more solvent that is necessary for solution. Usually, extraction is best carried out under conditions whereby the solvent is present in amount so that not quite all the acids are dissolved.

The unreacted wax phase collects at the bottom of the extraction zone and when the temperature of the mixture is above the melting point of the wax, it is separated by withdrawal in the liquid phase. Or the extraction mixture may be cold settled for separation of wax, i. e., cooled to below the melting point of the wax whereupon the wax solidifies in the bottom of the extraction vessel. In this case, the higher solvent layer will contain solid acids in slurry form as well as dissolved acids. Depending on acids treated, this may result in a 3-phase system, clear upper layer amber in color, middle layer containing suspended particles of oxidate and a lower mass of crystalline wax. Upon heating the mixture again to above the melting point of the wax, without any agitation, the wax may be drawn out of the bottom of the vessel, or the upper solvent-acid slurry can be pumped out of the vessel. It may be advisable to test a portion of this acid mixture for additional wax content by diluting it with solvent in an ordinary beaker and examining for wax precipitation. In fact, by any of these procedures, the wax should be extracted again with solvent for further purification although it may be recycled in such form to the oxidation reactor along with fresh wax for acid production.

The extraction temperature must be below the critical temperature of the solvent used while it is necessary to employ a pressure sufficient to maintain the solvent in liquid phase at the selected temperature. Thus depending upon the operating temperature, the extraction will be either of liquid-liquid contact or liquid-solid, since the crude acids melt around 125° to 135° F. Generally, the temperature employed may be in an elevated range approximating about 70° to about 200° F. Advantageously, I prefer a temperature over about 140° F. so as to provide liquid-liquid contact and thereby insure good contact between the materials in the extraction zone. At lower temperatures there is the additional disadvantage in that the solvent tends to lose some of its selectivity. In this regard temperatures between about 140° to 175° F. are particularly satisfactory.

Extraction is carried out in a conventional extraction vessel under the operating conditions selected. In particular, I prefer to use an extraction tower equipped with reflux condenser so as to operate at a maximum possible extraction efficiency, that is, at higher temperatures thereby insuring good contact. The mixture of polar solvent and crude acid, advantageously preheated, is pumped, into the extraction vessel. It is agitated at the selected reflux temperature, e. g. 140 to 175° F., to insure thorough dispersion, as for about fifteen to thirty minutes or even more. The mixture is cooled to about 100° F., or to atmospheric temperature, without further agitation; and the upper slurry layer of solvent and dissolved and solid acids is separated from the lower solid wax layer. Or the mixture after agitation may be settled for two to eight hours at 140° to 160° F. and the layers then separated. In addition, one extraction may be made or the acid material may be subjected to a series of extractions. The solvent is separated from the acid by conventional means, such as by flash distillation.

Butane and normal pentane are exemplary solvents for the hydrocarbon fractionation step. The solvent, however, may be of straight chain structure or branched chain or cyclic. Mixtures of hydrocarbons advantageously are used, and the hydrocarbon solvent may contain a relatively small amount of unsaturates or aromatics, such as up to about 10 per cent by weight on the solvent composition used. Indeed, suitable refinery cuts provide low cost sources of these solvents such as a naphtha cut from a boiling range of 80° to 200° F. The hydrocarbon solvent should be used in the ratio of about 2:1 to 12:1 by weight to the crude acids. Separation is difficult when less than about 2:1 solvent-crude acid ratio is maintained while with a ratio of about 12:1 yields are appreciably lower. Within this range, increases in the ratio tend to result in lower yields of pure acids, although increases in solvent produce higher weight acids of slightly better color. Advantageously, the extraction is carried out at ratios of hydrocarbon solvent to crude acid in the range of about 2.5:1 to 4:1 by weight.

In selecting a hydrocarbon solvent for maximum yields, the higher molecular weight solvents are unusually good for extracting the lighter crude acids while the reverse is also true, the lighter solvents are most suitable for the heavier acid mixtures. In terms of the most simple correlation, I consider the $C_3$ to $C_6$ hydrocarbons in the lighter solvent range and that such solvents are best adapted to crude acid mixtures having saponification numbers of 250 and less and that the $C_6$ to $C_{12}$ hydrocarbons function best on crudes of about 250 and higher saponification numbers. Optimum results are obtained by adjustment of the extraction temperature to the solvent employed and therefore indirectly to the acids being extracted. Thus the lighter solvents which are more satisfactory for the heavier acids, are employed at extraction temperatures of about 80° to 140° F. while the heavier solvents, for use on the lighter acids, should be employed at extraction temperatures of about 125° to 200° F. For instance, propane or butane are especially satisfactory for 200–225 saponification number acids at about 80° to 100° F. $C_8$ to $C_{10}$ solvents extract high yields of pure acids from 300 to 325 saponification crudes at temperatures of 125° to 150° F. However, satisfactory yields of pure acids from crudes of varying molecular weights may be obtained where the solvent is employed at its most favorable temperature although it is not correlated to the crude acid being extracted, such as a heavy solvent on a heavy acid at high temperatures. But where neither the solvent, extraction temperature or crude are taken into consideration, as I have disclosed, yields and product color are not particularly satisfactory. For instance, extraction of heavy acids with a heavy solvent, but at low temperatures results in poorly colored products.

Essentially, the naphtha fractionation is carried out by thoroughly mixing the solvent and crude acid material, maintaining the mixture at the desired extraction temperature, and separating the impure matter which drops out of solution. Precipitation of the impure bottoms is promoted by cooling the mixture to room temperature or slightly higher, say to about 100° F. The acid-solvent portion is then distilled to recover the hydrocarbon solvent, such as by flash distillation under reduced pressure. The extraction is carried out under pressure conditions so that the hydrocarbon solvent remains in liquid phase. For instance, when propane, butane and pentane are employed as solvents at low temperatures, pressures as high as 200 to 300 p. s. i. may be needed. One extraction may be made or the acid material may be subjected to a number of extractions or passes with the solvent. Although separation of the heavy impure bottoms most advantageously should depend on gravity, it is also possible, especially with low solvent-acid ratios, to employ centrifugation. Preferably, extraction is carried out in an extraction tower, which may be equipped for high pressures and with reflux condensers where necessary. An internal cooling coil may be used to cool the mixtures for better separation. The acid and hydrocarbon solvent are initially heated and mixed in a separate mixing vessel and then are charged to the extraction tower for separation.

After extraction with the polar solvent, but prior to naphtha extraction, various molecular weight fractions of the acids can be separated in substantially pure form from the polar solvent-oxidate mixture by fractional crystallization. This is readily accomplished by partial evaporation of the mixture to crystallize out the heavier acid fractions which will solidify as the solvent concentration becomes successively weaker. The oxidate fractions mixture then may be separately passed to the naphtha extraction.

Advantageously, the crude acid compositions may be additionally purified by either simple washing in an aqueous medium or by a combined water and mineral acid wash. In this way inorganic impurities such as catalyst material are removed. Where the acid is washed by water and a mineral acid, such as hydrochloric acid, which I prefer to do, I have found that the final yield of pure acid is best when the water-acid wash follows both solvent extraction stages, although good-color stable products result when the washing technique is performed between the two extraction stages. For example, after final extraction with the hydrocarbon solvent, water and hydrochloric acid are added to the acid material recovered. The resulting mixture is stirred and permitted to settle. The acid-water layer which separates out is removed. The product may be washed again as with water alone, the water removed after another settling period and the washed product blown with air to evaporate any remaining water. The washed acids are then heated to about 200° F. while air blowing, in order to remove any residual hydrochloric acid or water present.

As already stated, the order of the extraction steps is important. Reversal of the operations, i. e. naphtha fractionation first, results in significant reduction in yields. Further, extracting with the polar solvent first has the advantage that the unreacted wax is separated from the oxidate without being carried through the entire operation with resulting increase in operating cost and likelihood of product contamination. The separated wax may be conveniently recycled to the oxidation process by which the crude oxidate is prepared. Removal of the dibasic acids and other oxygenated products in the bottoms from the hydrocarbon extraction is also facilitated by the present procedure.

By purifying the crude wax acid composition in accordance with my dual extraction procedure, purified products of good color characteristics, in terms of light color and stability thereof, and in excellent yields are obtained. Generally, the color of the extracted acid product ranges from pale cream to amber. Upon reaction to the corresponding salts by treatment with hot concentrated caustic, the favorable color characteristics are retained. Further, the dual extraction procedure gives excellent yields of the pure product. While the yield in the conventional distillation procedure may only be as high as 55 per cent for intermediate saponification number crudes, (170–250), as high as 70 per cent wherein the $C_3$ to $C_{12}$ extraction process is followed, the present process will account for practically all of the constituents of the crude acid by separation into its respective components and will produce a highly purified product. I have obtained yields as high as 97 per cent of products based on the original crude acid product.

The following examples are intended to more clearly illustrate the nature of the present extraction process.

Example I

A crude wax acid mixture having a saponification number of 113, an acid number of 76 and containing about 37 per cent inert material was obtained by oxidizing to complete conversion $C_{34}$ to $C_{55}$ microcrystalline wax in the presence of a small amount of a potassium permanganate catalyst. The crude product was first subjected to extraction with an aqueous solution of 95 per cent ethanol. The weight ratio of alcohol to acids was 6 to 1. The mixture was heated to a reflux temperature of 172° F. and stirred for 30 minutes. After cooling to 160° F. and settling for 4 hours, the two layers were separated. The lower layer upon stabilizing represented 20 weight per cent. This material analyzed as having a saponification No. 33 and acid No. 18. The extract was then diluted with alcohol to increase the weight ratio, alcohol to acid, to 8:1. After settling at 160° F. for 4 hours, two layers were again separated. The lower layer was washed with alcohol and then stabilized. It represented 17 weight per cent and had a saponification number of 10 and acid number of 3. The extract, after removal of the alcohol, represented 55 weight per cent of the original and had a saponification number of 178 and acid number 82. The material recovered by evaporation of the second bottoms wash alcohol represented 5 weight per cent and had a saponification number of 83 and an acid number 45. Thus the total recovery was 97 per cent, 37 per cent of which could be considered contaminated wax, and 60 per cent material having an average saponification number of 170. The theoretical saponification number of the carboxylic acids in the original mixture was 179. The acid mixture of saponification number 170 was then extracted with a 100°–165° F. naphtha cut at 125° F. and the product so obtained washed with water and hydrochloric acid.

Example II

A crude acid mixture having a saponification number of 247, an acid number of 139 and containing about 10 per cent inert material was obtained by oxidizing $C_{34}$ to $C_{55}$ microcrystalline wax in the presence of a small amount of a potassium permanganate catalyst. The crude acid mixture was extracted with an aqueous solution containing 95 per cent ethanol in an extraction vessel equipped with an agitator and maintained under moderate pressure. The bottoms product was allowed to settle out. The extract was obtained by distilling off the solvent. The results were as follows:

| Run No. | Alcohol-Acid, Wt. Ratio | Settling | | Extract | | | Bottoms | |
|---|---|---|---|---|---|---|---|---|
| | | Temp., °F. | Time, Hrs. | Yield, Wt. Percent | Sap. No. | Acid No. | Sap. No. | Acid No. |
| 1 | 6:1 | 160 | 4 | 66 | 256 | 133 | 170 | 66 |
| 2 | 6:1 | 145 | 4 | 69 | 261 | 117 | 175 | 40 |
| 3 | 6:1 | 145 | 4 | 67 | 249 | 129 | 191 | 83 |
| 4 | 6:1 | 148 | 6 | 33 (ppt.) | 232 | 113 | 176 | 76 |
| | | | | 30 (filtrate) | 270 | 135 | | |

In run number 4 two extract products were obtained (ppt. and filtrate) by partial solvent evaporation, cooling and filtering. The fractions were then stabilized.

Products treated in accordance with the foregoing procedure was then extracted with $C_3$ to $C_{12}$ saturated hydrocarbons solvents (as naphtha cuts) under moderate pressure in an extraction vessel equipped with an agitator. The bottoms was allowed to settle out and the pure extraction product was obtained by distillation. When certain of the extraction products obtained by ethanol extraction were treated with the organic solvents the bottoms always had a higher saponification number and acid number than the extract. The following results illustrate the extraction of the polar-solvent extracted materials by such hydrocarbon solvents.

| Charge Stock—Alcohol Extract Run No. | Sap. No. | Solvent Boiling Range, °F. | Settling Temp., °F. | Extract | | | Bottoms | |
|---|---|---|---|---|---|---|---|---|
| | | | | Yield, Wt. per-cent | Sap. No. | Acid No. | Sap. No. | Acid No. |
| 1 | 256 | 100–165 | 125 | 75 | 232 | 119 | 325 | 171 |
| 2 | 261 | 90–140 | 105 | 77 | 231 | 114 | | 145 |
| 3 | 249 | 90–140 | 80 | 90 | 248 | 117 | 285 | 142 |
| 4 (ppt.) | 232 | 90–130 | 85 | 60 | 191 | 92 | 273 | 103 |

In addition to the saponification and acid number analysis used for determining the efficiency of separation of the monocarboxylic acids from inert materials as shown in Examples I and II chromatographic adsorption on activated alumina and silica gel was also employed.

The accompanying drawing illustrates a somewhat schematic flow diagram of a continuous two stage extraction process according to my invention. As is shown by the drawing the crude acid composition is initially extracted with an alcohol solvent in extraction zone 4 and the acid extract so recovered is then separately processed with a $C_3$ to $C_{12}$ solvent in zone 24.

According to the drawing, a crude wax acid mixture having a saponification number of about 250 and containing about 10 per cent by weight of contamination material is charged to the system by line 1, preheated in heater 2 and passed by line 3 into extraction zone 4. Ethanol, employed as the first extraction solvent and fed to the process by line 5, is preheated in heater 6 and charged into the extraction zone by line 7. Extraction zone 4 is an extraction tower equipped with reflux condenser 8, internal cooling coils 9, and agitator 10. The crude acid and ethanol are introduced into the extraction tower in a solvent to crude ratio of about 8:1 by weight. The reflux temperature of the tower is mainatined at about 175° F. for fifteen to thirty minutes while the mixture is thoroughly agitated by means of agitator 10. Sufficient pressure is provided so that the solvent remains in liquid phase. Agitation is stopped and the mixture is then adjusted to about 145° F. by cooling coils 9. A lower wax layer forms during about four hours of settling over which is a slurry containing principally the alcohol and acid extract. The wax portion is removed as a bottoms product by line 11. This wax product may be used for preparation of additional wax acid mixtures by the oxidation process or may be recycled by line 12 for additional extraction in tower 4 since it usually contains small amounts of pure acids. The slurry layer containing the acids and solvent is taken off as overhead by line 13 and passed to flash zone 14, a flash drum, for removal of the solvent from the acid portion. The separated solvent is recovered by line 15 and may be recycled to the mixing zone as desired or removed from the system by bleed line 16. The acids are removed from the flash zone by line 17. However, the lower molecular weight wax acid fractions may be advantageously separated from the solvent-oxidate mixture before further extraction by fractional crystallization in zone 46. This is accomplished by passing the mixture by line 44 to evaporator 46 and partial evaporating off the solvent to crystallize out the heavier acid fractions. The remaining solvent-oxidate mixture is then passed to the naphtha extraction by line 47. The recovered acids are removed through line 45 by heating to above their melting point and are separately passed through the naphtha extraction operation.

The acid material so treated is then extracted with a $C_3$ to $C_{12}$ unsaturated hydrocarbon solvent. This is accomplished by preheating the alcohol-extracted acids from line 17 in heater 18 and passing the heated acid material by line 19 into a mixing vessel 20 equipped with a mechanical stirrer, 21. A 100°-140° F. boiling range naphtha cut containing over 90 per cent $C_3$ to $C_6$ saturated hydrocarbons, employed as the solvent in the second stage, is charged from line 22 to the same mixing vessel 20, being also preheated in heater 18. The heated acid and solvent are thoroughly agitated in the vessel 20 whereupon they are passed by line 23 to extraction zone 24. Extraction zone 24 is an extraction tower equipped with reflux condenser 25 and internal cooling coil 26. The acid material and hydrocarbon solvent are introduced into the extraction tower in a solvent to acid ratio of about 3:1 by weight. The reflux temperature of the tower is maintained at about 100° to 125° F. during extraction and sufficient pressure provided so that the solvent is maintained in liquid phase. The mixture is then cooled to atmospheric temperature by cooling coil 26. A light solvent fraction, containing principally the solvent and acid extract is taken off overhead by line 27 while a heavy product, made up of organic impurities and which may contain a small amount of solvent, is removed as bottoms by line 28. The overhead solvent fraction is then passed by line 29 to flash zone 30, a flash drum, for removal of the hydrocarbon solvent from the acid. The separated solvent is removed by line 31 from the flash drum 30 and may be recycled to the mixing zone as desired or bled from the system by bleed line 32.

Advantageously, the pure acids so recovered are additionally washed and dried as shown. The pure acid material is passed by line 33 to washing vessel 34, equipped with mechanical stirrer 35. Water and hydrochloric acid are added to the vessel by lines 36 and 37, respectively. The resulting mixture is stirred and then permitted to settle. The acid-water layer which forms is removed by line 38. Then the mixture is washed with water alone from line 36, the mixture agitated, allowed to settle and the wash water removed by line 38. The washed product is then passed by line 39 for drying in vessel 40. The acid is blown with air passed through by lines 41 and 42 and during the air blowing operation it is heated to about 200° F. in order to remove any residual water or hydrochloric acid that might be present. The pure acid product so obtained is removed from the system by line 43.

The pure acid product obtained has a saponification number of about 225 and substantially all of the 10 per cent contaminating materials are removed.

I claim:

1. In the purification of crude wax acid compositions characterized by saponification numbers in the range of about 100 to 500, high content of fatty acids having upwards of 18 carbon atoms per molecule and obtained by oxidation of $C_{34}$ to $C_{55}$ microcrystalline wax, the steps of extracting the crude oxidate with a lower boiling oxygen-containing organic polar solvent at a ratio of solvent to oxidate of between about 6:1 to 10:1 by weight and under conditions of temperature and pressure whereby the solvent is maintained in liquid phase, separating the extract phase, recovering the oxidate therefrom, extracting the polar solvent-extracted oxidate with a saturated hydrocarbon solvent of the group containing three to twelve carbon atoms per molecule at a ratio of solvent to oxidate between about 2:1 to 12:1 by weight and under conditions of temperature and pressure whereby the solvent is maintained in liquid phase, washing the wax oxidate with water and a mineral acid subsequent to an extraction step, and recovering the purified wax acids from the solvent mixture.

2. A process according to claim 1 wherein the oxidate is washed with water and hydrochloric acid after extraction with the organic polar solvent.

3. A process according to claim 1 wherein the polar extraction agent is a lower aliphatic alcohol.

4. A process according to claim 1 wherein a plurality of polar extractions are carried out prior to hydrocarbon extraction.

5. A process according to claim 1 wherein the polar solvent-oxidate mixture is subjected to partial evaporation for fractional crystallization of acid material into fractions of limited molecular weight ranges.

6. A process according to claim 1 wherein the oxidate is washed with water and hydrochloric acid after extraction with the saturated hydrocarbon solvent.

References Cited in the file of this patent

UNITED STATES PATENTS

| Number | Name | Date |
|---|---|---|
| 1,885,199 | Hellthaler et al. | Nov. 1, 1932 |
| 1,909,295 | Luther et al. | May 16, 1933 |
| 1,987,208 | Peukert | Jan. 8, 1935 |
| 1,993,646 | Burwell | Mar. 5, 1935 |
| 2,002,533 | Forlich et al. | May 28, 1935 |
| 2,222,215 | Ewing | Nov. 19, 1940 |
| 2,318,669 | Carr | May 11, 1943 |